United States Patent
Kim et al.

(10) Patent No.: US 9,557,603 B2
(45) Date of Patent: Jan. 31, 2017

(54) METHOD OF MANUFACTURING LIQUID CRYSTAL DISPLAY PANEL

(71) Applicant: Samsung Display Co., Ltd., Yongin (KR)

(72) Inventors: Young Gu Kim, Hwaseong-si (JP); Baek-Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 51 days.

(21) Appl. No.: 14/609,192

(22) Filed: Jan. 29, 2015

(65) Prior Publication Data

US 2015/0338696 A1 Nov. 26, 2015

(30) Foreign Application Priority Data

May 20, 2014 (KR) ........................ 10-2014-0060432

(51) Int. Cl.
*G02F 1/1343* (2006.01)
*G02F 1/1337* (2006.01)
*G02F 1/13* (2006.01)
*B82Y 40/00* (2011.01)

(52) U.S. Cl.
CPC .......... *G02F 1/133707* (2013.01); *B82Y 40/00* (2013.01); *G02F 2001/1316* (2013.01); *G02F 2001/134318* (2013.01); *G02F 2201/123* (2013.01); *Y10S 977/784* (2013.01); *Y10S 977/952* (2013.01)

(58) Field of Classification Search
CPC ........................................ G02F 2001/134318
See application file for complete search history.

(56) References Cited

U.S. PATENT DOCUMENTS

| 7,679,713 | B2 | 3/2010 | Choi | |
| 9,268,178 | B2* | 2/2016 | Takano | ............ G02F 1/134363 |
| 9,310,652 | B2* | 4/2016 | Yonekura | ........... G02F 1/134336 |
| 2008/0121612 | A1* | 5/2008 | Nam | ..................... B82Y 10/00 |
| | | | | 216/23 |

(Continued)

FOREIGN PATENT DOCUMENTS

| JP | 2008-299209 | 12/2008 |
| KR | 10-0586869 | 6/2006 |

(Continued)

OTHER PUBLICATIONS

Hyeon Su Jeong, et al., "Bifunctional ITO layer with a high resolution, surface nano-pattern for alignment and switching of LCs in device applications," NPG Asia Materials, Feb. 17, 2012, pp. 1-7, 4, e7, Nature Publishing Group.

(Continued)

*Primary Examiner* — Phu Vu
(74) *Attorney, Agent, or Firm* — H.C. Park & Associates, PLC

(57) ABSTRACT

A method of manufacturing a liquid crystal display panel including forming a pixel electrode including first nano-conductive lines extending in a first direction on a first base substrate and arranged in a second direction substantially perpendicular to the first direction, disposing a second base substrate above the first base substrate, and forming a liquid crystal layer on the first nano-conductive lines, which is aligned by the first nano-conductive lines.

12 Claims, 15 Drawing Sheets

(56) References Cited

U.S. PATENT DOCUMENTS

| | | | |
|---|---|---|---|
| 2008/0268280 A1* | 10/2008 | Cho | C23C 18/1603 |
| | | | 428/615 |
| 2013/0021542 A1* | 1/2013 | Ito | G02F 1/133345 |
| | | | 349/5 |
| 2013/0088657 A1* | 4/2013 | Takano | G02F 1/134363 |
| | | | 349/38 |
| 2013/0088667 A1* | 4/2013 | Kong | G02F 1/133528 |
| | | | 349/96 |
| 2013/0182202 A1 | 7/2013 | Graziano et al. | |
| 2015/0014693 A1* | 1/2015 | Lee | H01L 27/124 |
| | | | 257/72 |

FOREIGN PATENT DOCUMENTS

| | | |
|---|---|---|
| KR | 10-2011-0069486 | 6/2011 |
| KR | 10-1144915 | 5/2012 |
| KR | 10-1231898 | 2/2013 |

OTHER PUBLICATIONS

Daniel K Schwartz, "Mechanisms and Kinetics of Self-Assembled Monolayer Formation," Annual Review of Physical Chemistry, Oct. 2001, 107-137, vol. 52, Annual Reviews, Palo Alto, California.

* cited by examiner

METHOD OF MANUFACTURING LIQUID CRYSTAL DISPLAY PANEL

CROSS-REFERENCE TO RELATED APPLICATION

This application claims priority from and the benefit of Korean Patent Application No. 10-2014-0060432, filed on May 20, 2014, which is hereby incorporated by reference for all purposes as if fully set forth herein.

BACKGROUND

Field

Exemplary embodiments relate to a method of manufacturing a liquid crystal display panel. More particularly, exemplary embodiments relate to a method of manufacturing a liquid crystal display panel, which is capable of simplifying the manufacturing process.

Discussion of the Background

A display apparatus includes a display panel, such as a liquid crystal display panel, a plasma display panel, an organic light emitting display panel, an electrophoretic display panel, an electrowetting display panel, etc., according to a display element thereof.

Among them, the liquid crystal display panel includes an upper substrate, a lower substrate facing the upper substrate, and a liquid crystal layer interposed between the upper substrate and the lower substrate. The liquid crystal layer includes liquid crystal molecules oriented in response to an electric field formed by voltages applied to electrodes disposed on the upper and lower substrates.

The liquid crystal molecules are oriented in a predetermined direction, and then the alignment direction of the liquid crystal molecules is changed in accordance with the electric field. The liquid crystal display panel controls an amount of light passing through the liquid crystal layer using the electric field, and thus, a desired image is displayed.

The above information disclosed in this Background section is only for enhancement of understanding of the background of the inventive concept, and, therefore, it may contain information that does not constitute prior art.

SUMMARY

Exemplary embodiments provide a method of manufacturing a liquid crystal display panel, which is capable of controlling an alignment of liquid crystal molecules in accordance with a shape of an electrode and simplifying a manufacturing process of the liquid crystal display panel.

Additional aspects will be set forth in the detailed description which follows, and, in part, will be apparent from the disclosure, or may be learned by practice of the inventive concept.

The present disclosure provides a method of manufacturing a liquid crystal display panel, which includes a pixel electrode provided with a nano-conductive line using a self-assembled monomer layer.

Exemplary embodiments of the inventive concept provide a method of manufacturing a liquid crystal display panel, including forming a pixel electrode including first nano-conductive lines extending in a first direction on a first base substrate and being arranged in a second direction substantially perpendicular to the first direction, disposing a second base substrate above the first base substrate, and forming a liquid crystal layer on the first nano-conductive lines. The liquid crystal layer is oriented by the first nano-conductive lines. The forming of the pixel electrode includes forming first self-assembled monomer lines extending in the first direction on the first base substrate, forming a conductive layer on the first base substrate to cover the first self-assembled monomer lines, and removing the first self-assembled monomer lines to form the first nano-conductive lines from the conductive layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
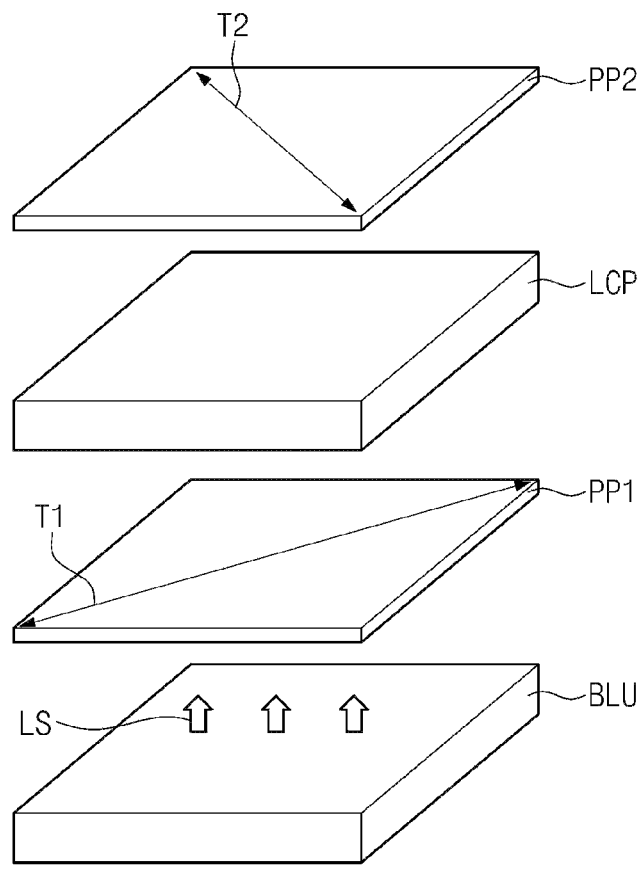
FIG. 1 is an exploded perspective view showing a liquid crystal display according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is an exploded perspective view showing a liquid crystal display according to an exemplary embodiment of the present disclosure.

Referring to FIG. 1, the liquid crystal display (hereinafter, referred to as a display apparatus) includes a liquid crystal display panel LCP (hereinafter, referred to as a display panel), polarizers PP1 and PP2 respectively disposed on and under the display panel LCP, and a backlight unit BLU disposed under the display panel LCP to supply light LS to the display panel LCP.

The display panel LCP includes two substrates (not shown) facing each other and a liquid crystal layer (not shown) interposed between the two substrates.

The polarizers PP1 and PP2 include a first polarizer PP1 disposed under the display panel LCP and a second polarizer PP2 disposed on the display panel LCP.

The first polarizer PP1 has a first transmission axis T1 and linearly polarizes the light LS incident thereto in a direction substantially parallel to the first transmission axis T1.

The second polarizer PP2 has a second transmission axis T2 and transmits the light, which is incident thereto, so as to exit from the display panel LCP, and polarizes the exiting light in a direction substantially parallel to the second transmission axis T2.

In FIG. 1, the first transmission axis T1 of the first polarizer PP1 is substantially perpendicular to the second transmission axis T2 of the second polarizer PP2. Although not shown, the second transmission axis T2 of the second polarizer PP2 may instead be parallel to the first transmission axis T1 of the first polarizer PP1. The second transmission axis T2 of the second polarizer PP2 varies depending on a light transmission mode of the display panel LCP.

For instance, when the display apparatus is operated in a normally white mode, a light axis of the incident light is rotated along a liquid crystal direction due to an optical activity while the display panel LCP is in non-activation state. Accordingly, the light incident into the first polarizer PP1 is linearly polarized in a direction parallel to the first transmission axis T1.

The light passing the first polarizer PP1 transmits through the second polarizer PP2 after the linearly-polarized light is rotated at about 90 degrees bypassing through the liquid crystal layer LCL. Therefore, the display apparatus displays a white color during the non-activation state.

The backlight unit BLU supplies the light LS to the display panel LCP. The backlight unit BLU includes a cold cathode fluorescent lamp or a light emitting diode as its light source. The backlight unit BLU is classified as either an edge-illumination type backlight unit or a direct-illumination type backlight unit according to the position of the light source. The edge-illumination type backlight unit includes a light guide plate to guide the light. The backlight unit BLU further includes optical sheets, e.g., a prism sheet, a diffusion sheet, etc., to improve an optical property of the light.

Figure 2:
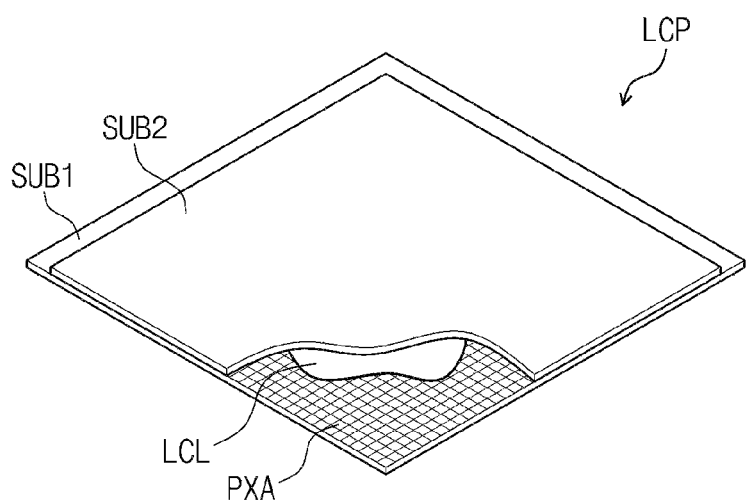
FIG. 2 is a perspective view showing a display panel according to an exemplary embodiment of the present disclosure.
Figure 3A:
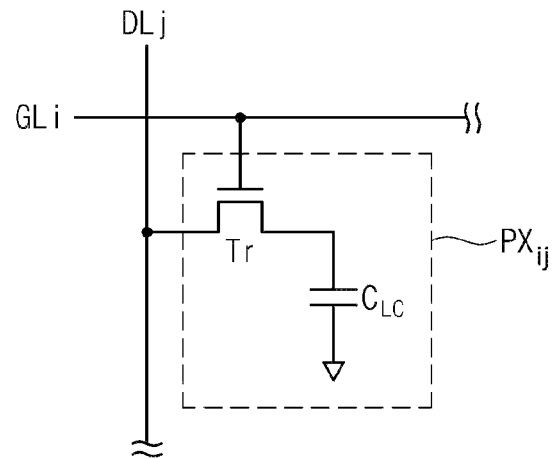
FIG. 3A is a circuit diagram showing a pixel according to an exemplary embodiment of the present disclosure.
Figure 3B:
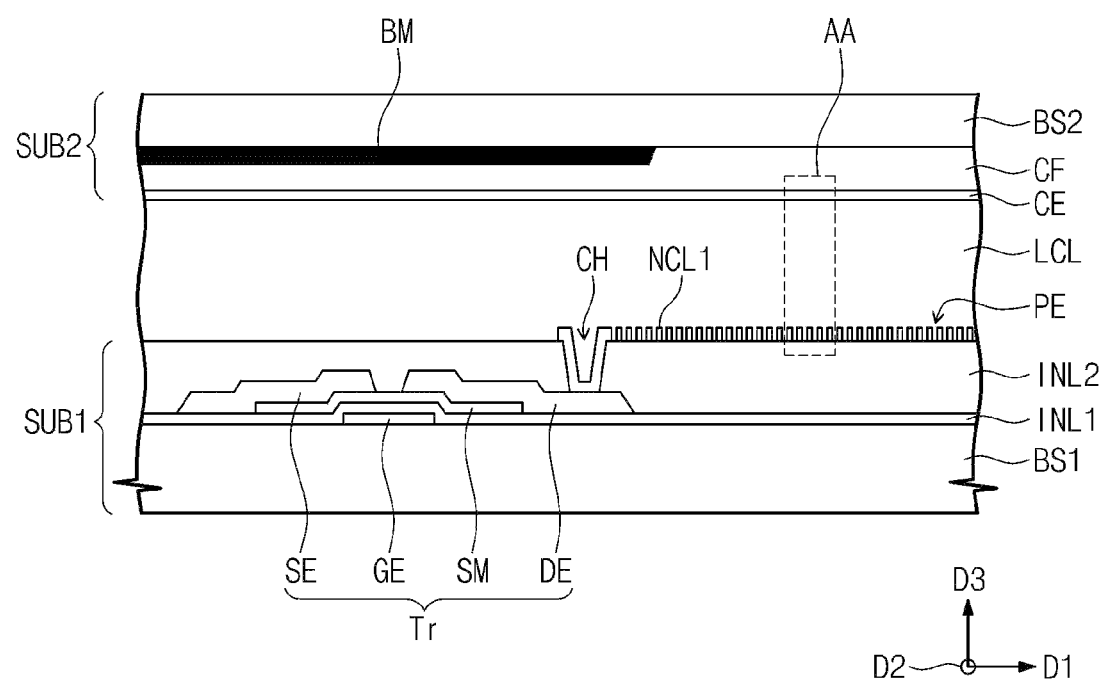
FIG. 3B is a cross-sectional view showing a display panel according to an exemplary embodiment of the present disclosure.

FIG. 2 is a perspective view showing a display panel according to an exemplary embodiment of the present disclosure, FIG. 3A is a circuit diagram showing a pixel according to an exemplary embodiment of the present disclosure, and FIG. 3B is a cross-sectional view showing a display panel according to an exemplary embodiment of the present disclosure.

Referring to FIGS. 2, 3A, and 3B, the display panel LCP includes a first substrate SUB1, a second substrate SUB2, and the liquid crystal layer LCL. The first and second substrates SUB1 and SUB2 face each other, and the liquid crystal layer LCL is disposed between the first and second substrates SUB1 and SUB2.

The first substrate SUB1 includes pixel areas PXA arranged in a matrix form. Pixels are disposed in the pixel areas PXA in a one-to-one correspondence.

The first substrate SUB1 includes a first base substrate BS1, gate lines, data lines, thin film transistors, and pixel electrodes. Although not shown, the gate lines extend in a first direction D1 and are arranged in a second direction crossing the first direction D1. The data lines are insulated from the gate lines while crossing the gate lines.

In the present exemplary embodiment, the pixels have the same structure and function, and thus, only one pixel area in which one pixel $PX_{ij}$ has been shown in FIGS. 3A and 3B.

The pixel $PX_{ij}$ is connected to a corresponding gate line GLi of the gate lines and a corresponding data line DLj of the data lines.

The pixel $PX_{ij}$ is turned on in response to a gate signal provided from the gate line GLi. The pixel $PX_{ij}$ includes a thin film transistor Tr and a liquid crystal capacitor $C_{LC}$ connected to the thin film transistor Tr.

The first base substrate BS1 shown in FIG. 3B may be a transparent insulating substrate, such as a glass substrate, a plastic substrate, etc.

The thin film transistor Tr outputs a data signal provided through the data line DLj in response to the gate signal provided through the gate line GLi. The thin film transistor Tr includes a gate electrode GE, a semiconductor pattern SM, a source electrode SE, and a drain electrode DE. The gate electrode GE is connected to the gate line GLi.

The gate electrode GE includes a conductive material. For instance, the gate electrode GE includes at least one of a metal material, e.g., nickel (Ni), chromium (Cr), molybdenum (Mo), aluminum (Al), titanium (Ti), copper (Cu), and tungsten (W), etc., an alloy of the metal material, and an oxide of the metal material.

The gate electrode GE has a single-layer structure or a multi-layer structure. The gate electrode GE includes the same material as that of the gate line GLi, and has the same layer structure as that of the gate line GLi.

The display panel LCP further includes a first insulating layer INL1. The first insulating layer INL1 is disposed on the first base substrate BS1 to cover the gate electrode GE and the gate line GLi. The first insulating layer INL1 includes an inorganic material, such as silicon oxide, silicon nitride, silicon oxy-nitride, etc.

The semiconductor pattern SM is disposed on the first insulating layer INL1. The semiconductor pattern SM is partially overlapped with the gate electrode GE. The source electrode SE and the drain electrode DE are disposed on the first insulating layer INL1.

One end of the source electrode SE is connected to the data line DLj, and the other end of the source electrode SE is overlapped with the semiconductor pattern SM. One end of the drain electrode DE is overlapped with the semiconductor pattern SM and the other end of the drain electrode DE is overlapped with the pixel electrode PE. The other end of the source electrode SE and the one end of the drain electrode DE are spaced apart from each other.

The source electrode SE and the drain electrode DE include a conductive material. In detail, each of the source electrode SE and the drain electrode DE includes at least one of nickel (Ni), chromium (Cr), molybdenum (Mo), aluminum (Al), titanium (Ti), copper (Cu), and tungsten (W), and an alloy thereof.

Each of the source electrode SE and the drain electrode DE has a single-layer structure or a multi-layer structure. The data line DLj includes the same material as that of the source electrode SE, and has the same layer structure as that of the source electrode SE.

The display panel LCP further includes a second insulating layer INL2. The second insulating layer INL2 is disposed on the first insulating layer INL1 to cover the thin film transistor Tr.

The second insulating layer INL2 includes an organic layer and/or an inorganic layer. The second insulating layer INL2 has a single-layer structure or a multi-layer structure. For instance, the second insulating layer INL2 may include the inorganic layer disposed on the thin film transistor Tr and the organic layer disposed on the inorganic layer and providing a flat upper surface.

The liquid crystal capacitor $C_{LC}$ includes the pixel electrode PE connected to the thin film transistor Tr, a common electrode CE facing the pixel electrode PE, and a dielectric layer disposed between the pixel electrode PE and the common electrode CE. In the present exemplary embodiment, the dielectric layer corresponds to the liquid crystal layer LCL. The liquid crystal capacitor $C_{LC}$ is charged with electric charges corresponding to a difference between a voltage corresponding to the data signal applied to the thin film transistor Tr and a voltage applied to the common electrode CE.

The pixel electrode PE is disposed on the second insulating layer INL2. The pixel electrode PE is electrically connected to the drain electrode DE through a contact hole CH formed through the second insulating layer INL2. The pixel electrode PE includes a transparent conductive material. For instance, the pixel electrode PE includes at least one of indium oxide, gallium oxide, titanium oxide, and zinc oxide.

The pixel electrode PE electrically connected to the drain electrode DE through the contact hole CH receives the voltage corresponding to the data signal.

The liquid crystal layer LCL includes liquid crystal molecules having directivity. The liquid crystal molecules are oriented in accordance with an electric field formed by the difference in voltage between the common electrode CE and the pixel electrode PE, and thus, an amount of the light passing through the liquid crystal layer LCL is controlled by the alignment of the liquid crystal molecules.

The pixel electrode PE includes first nano-conductive lines NCL1. The first nano-conductive lines NCL1 extend in a second direction D2 and are arranged in the first direction D1.

Although not shown, ends of the first nano-conductive lines NCL1 are connected to each other. The first nano-conductive lines NCL1 are electrically connected to the drain electrode DE. The first nano-conductive lines NCL1 disposed in one pixel area PXA and connected to the same thin film transistor are applied with the same voltage.

The direction in which the first nano-conductive lines NCL1 extend exerts an influence on the alignment of the liquid crystal molecules of the liquid crystal layer LCL. Among the liquid crystal molecules of the liquid crystal layer LCL, the liquid crystal molecules disposed adjacent to the pixel electrode PE are oriented in the direction substantially parallel to the extension direction of the first nano-conductive lines NCL1. The pixel electrode PE and the alignment of the liquid crystal layer LCL will be described in detail later.

In the present exemplary embodiment, the common electrode CE is included in the second substrate SUB2. The second substrate SUB2 includes a second base substrate BS2, a color filter CF, a black matrix BM, and the common electrode CE. The second base substrate BS2 includes an insulating material. For instance, the second base substrate BS2 may be a transparent substrate, e.g., a glass substrate, a plastic substrate, etc.

The color filter CF is disposed on the second base substrate BS2 and faces the first substrate SUB1. The color filter CF assigns colors to the light passing through the liquid crystal layer LCL.

For instance, the color filter CF may include a red, blue, green, white, cyan, or yellow color. The color of the color filter CF may be changed every one pixel or every two or more pixels.

The black matrix BM blocks the light exiting through the liquid crystal layer LCL. The black matrix BM includes a material having high reflectivity. The black matrix BM may include a metal material or a black resin material, e.g., chromium, a double layer of chromium/chromium oxide, a carbon pigment, a graphite, etc.

The black matrix BM is overlapped with the thin film transistor Tr, the gate line GLi, and the data line DLj. The black matrix BM prevents the thin film transistor Tr, the gate line GLi, and the data line DLj from being perceived and light leakage from occurring in an area except for the pixel electrode PE. In addition, the black matrix BM prevents colors of the color filter CF from interfering with each other, and thus, a definition of the color is improved.

Although not shown, the color filter CF and/or the black matrix BM may be included in the first substrate SUB1 according to embodiments.

The common electrode CE is disposed on the color filter CF. As described above, the common electrode CE forms the liquid crystal capacitor $C_{LC}$ in cooperation with the pixel electrode PE. The common electrode CE includes a transparent conductive material. For instance, the common electrode CE may include at least one of indium tin oxide, indium zinc oxide, indium gallium zinc oxide, fluorine zinc oxide, gallium zinc oxide, and tin oxide.

The common electrode CE includes second nano-conductive lines NCL2, to be described later. The second nano-conductive lines NCL2 extend in a direction substantially perpendicular to the first nano-conductive lines NCL1. Although not shown in figures, the second nano-conductive lines NCL2 may be arranged substantially parallel to the pixel electrode PE. Ends of the second nano-conductive lines NCL2 are connected to each other, and thus, the second nano-conductive lines NCL2 are applied with the same voltage. The direction in which the second nano-conductive lines extend exerts an influence on the alignment of the liquid crystal molecules of the liquid crystal layer LCL. Among the liquid crystal molecules of the liquid crystal layer LCL, the liquid crystal molecules disposed adjacent to the common electrode CE are aligned in the direction substantially parallel to the extension direction of the second nano-conductive lines NCL2. The alignment of the liquid crystal layer LCL is determined depending on the alignment direction of the liquid crystal molecules. The common electrode CE and the alignment of the liquid crystal layer LCL will be described in detail later.

Although not shown, the pixel $PX_{ij}$ further includes a storage capacitor (not shown) connected to the thin film transistor Tr and the liquid crystal capacitor $C_{LC}$ in parallel. The storage capacitor is defined by the pixel electrode PE connected to the thin film transistor Tr, a storage electrode facing the pixel electrode PE, and a dielectric layer disposed between the pixel electrode PE and the common electrode CE. In the present exemplary embodiment, the dielectric layer corresponds to a layer including the first and second insulating layers INL1 and INL2.

Although not shown, the common electrode CE may be included in the first substrate SUB1. In this case, the common electrode CE is disposed on the same layer as the pixel electrode PE or on a layer different from a layer on which the pixel electrode PE is disposed such that an insulating layer is disposed between the common electrode CE and the pixel electrode PE.

Although not shown, an insulating layer (not shown) may be further disposed between the common electrode CE and the color filter CF. The insulating layer prevents moisture from entering the common electrode CE and the liquid crystal layer LCL from the color filter CF.

Figure 4A:
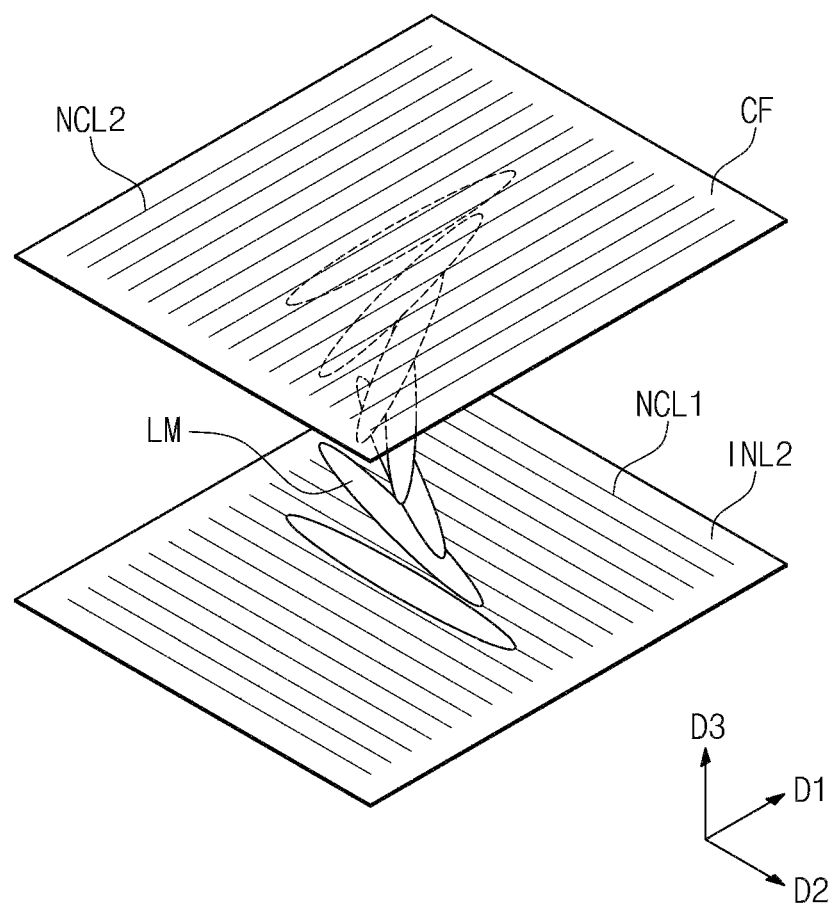
FIG. 4A and FIG. 4B are partially enlarged views showing a portion of a display panel according to an exemplary embodiment of the present disclosure.
Figure 4B:
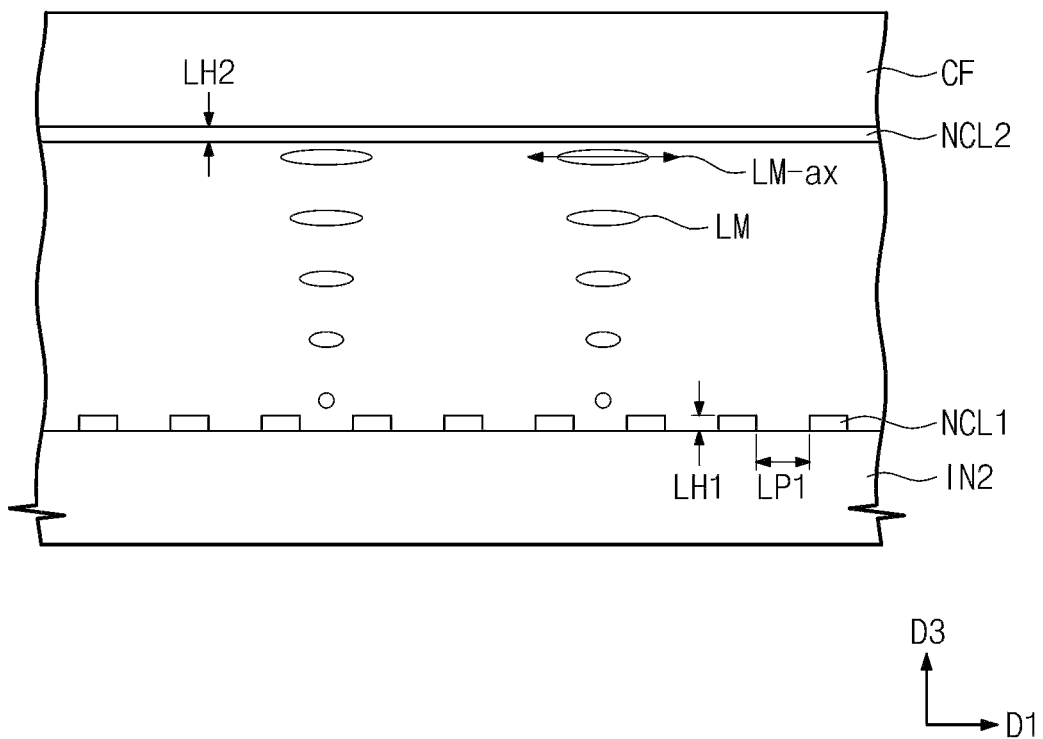

FIGS. 4A and 4B are partially enlarged views showing a portion of a display panel according to an exemplary embodiment of the present disclosure. In FIGS. 4A and 4B, the alignment of the liquid crystal molecules according to the arrangement of the pixel electrode and the common electrode will be described with reference to an area AA shown in FIG. 3B.

Referring to FIGS. 4A and 4B, the first nano-conductive lines NCL1 are arranged to cross the second nano-conductive lines NCL2 when viewed in a plan view. In detail, the first nano-conductive lines NCL1 extend in the second direction D2 and are arranged in the first direction D1.

The second nano-conductive lines NCL2 extend in the first direction D1 and area arranged in the second direction D2. The extension direction of the first nano-conductive lines NCL1 is substantially perpendicular to the extension direction of the second nano-conductive lines NCL2, as shown in FIG. 4A.

The liquid crystal molecules LM are oriented by the first and second nano-conductive lines NCL1 and NCL2. The liquid crystal molecules LM are oriented such that a molecule axis LM-ax of the liquid crystal molecules disposed adjacent to the pixel electrode PE is substantially parallel to the extension direction of the first nano-conductive lines NCL1. The liquid crystal molecules LM are oriented such that the molecule axis LM-ax of the liquid crystal molecules disposed adjacent to the common electrode CE is substantially in parallel to the extension direction of the second nano-conductive lines NCL2.

The alignment direction of the liquid crystal molecules disposed adjacent to the pixel electrode PE is substantially perpendicular to the alignment direction of the liquid crystal molecules disposed adjacent to the common electrode CE. Accordingly, the liquid crystal molecules are oriented in a spiral shape between the first substrate SUB1 and the second substrate SUB2. In this case, the liquid crystal layer LCL has a twisted nematic liquid crystal alignment. The display apparatus according to the present exemplary embodiment is operated in the normally white mode.

The alignment of the liquid crystal layer LCL is determined depending on a surface state of the layer with which the liquid crystal layer LCL makes contact. In the present exemplary embodiment, the surface state of the pixel electrode PE, with which the liquid crystal layer LCL makes contact, is changed by a distance LP1 between the first nano-conductive lines NCL1 and a height LH1 of the first nano-conductive lines NCL1, and the surface state of the common electrode CE, with which the liquid crystal layer LCL makes contact, is changed by a distance (not shown) between the second nano-conductive lines NCL2 and a height LH2 of the second nano-conductive lines NCL2.

The alignment of the liquid crystal layer LCL is determined depending on a surface anchoring energy. Since the alignment of the liquid crystal layer LCL is exerted by elastic restoring forces, the alignment of the liquid crystal layer LCL may be easily controlled by the first nano-conductive lines NCL1 as the surface anchoring energy increases. The surface anchoring energy satisfies the following Equation.

$$W = \frac{2\pi^3 K A^2}{\lambda^3} \quad \text{Equation (1)}$$

In Equation (1), "W" denotes the surface anchoring energy, "A" denotes an amplitude of grooves, "λ" denotes a distance between grooves, and "K" denotes a Frank elastic constant.

According to Equation (1), the surface anchoring energy W is exerted by morphology of the surface with which the liquid crystal layer LCL makes contact. The morphology of the surface varies depending on the shape of the grooves formed on the surface. The surface anchoring energy of a base with respect to the liquid crystal layer LCL is proportional to a square of the amplitude A of each groove formed in the base, and is inversely proportional to a cube of a distance λ between the grooves.

In the present exemplary embodiment, the first and second nano-conductive lines NCL1 and NCL2 may correspond to the grooves. According to the Equation, as the distance LP1 between the first nano-conductive lines NCL1 decreases, the surface anchoring energy W of the first substrate SUB1 against the liquid crystal layer LCL increases.

In addition, as the height LH1 of each of the first nano-conductive lines NCL1 increases, the surface anchoring energy W increases. Similarly, the surface anchoring energy of the second substrate SUB2 tends to increase as the distance between the second nano-conductive lines NCL2 decreases and the height LH2 of each of the second nano-conductive lines NCL2 increases.

In general, the surface anchoring energy produced by a rubbing process is in a range from about $10^{-4}$ to about $10^{-5}$ N/meter, the distance LP1 in the first direction D1 between the first nano-conductive lines NCL1 is equal to or less than about 1000 nm. The height LH1 of each first nano-conductive line NCL1 is equal to or less than about 20 nm. The second nano-conductive lines NCL2 may have the same shape as the first nano-conductive lines NCL1.

As described above, because the display panel does not include a polymer alignment layer, the light transmittance is improved and foreign substances are prevented from entering the alignment layer. Therefore, defects in the pixel are prevented from occurring. In addition, because the liquid crystal molecules are oriented by the nanometer-size electrode Each of the first nano-conductive lines NCL1 has the nanometer size, and thus, the first nano-conductive lines NCL1 do not exert influence on the light transmittance of the pixel electrode PE. Accordingly, the pixel electrode PE has alight transmittance similar to that when the pixel electrode PE is integrally formed as a single unitary and individual unit, and maintains the same conductivity as that when the pixel electrode PE is integrally formed as a single unitary and individual unit. Thus, a response time of the liquid crystal molecules may be prevented from being deteriorated, even though the display apparatus has a high resolution.

Figure 5A:
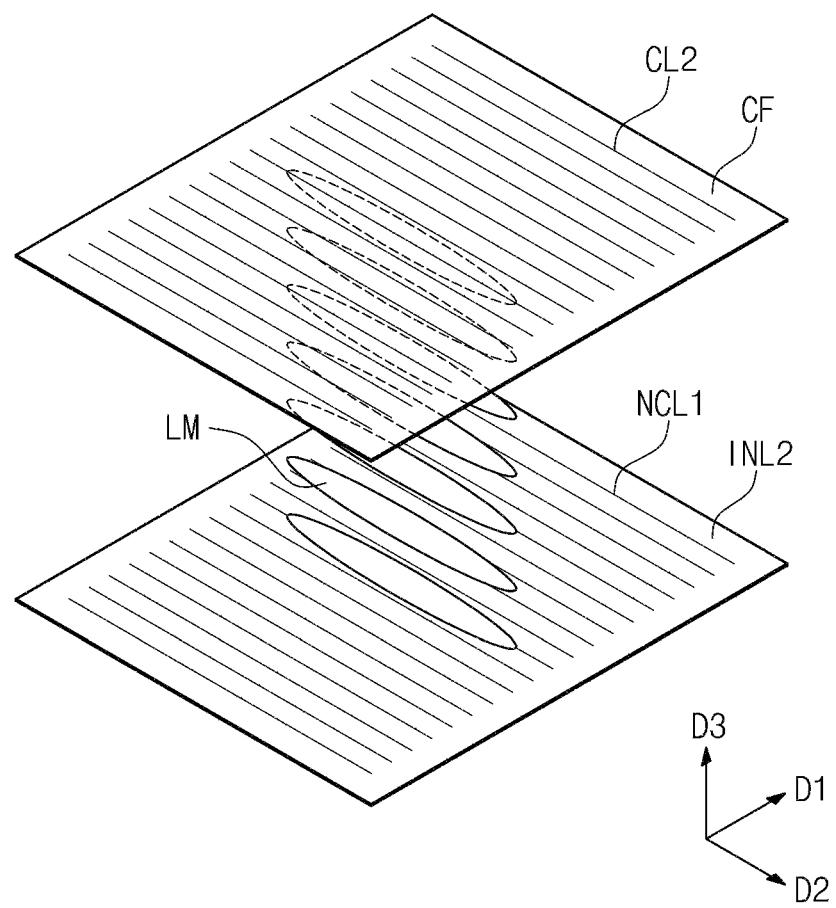
FIG. 5A, FIG. 5B, and FIG. 5C are partially enlarged views showing a portion of a display panel according to an exemplary embodiment of the present disclosure.
Figure 5B:
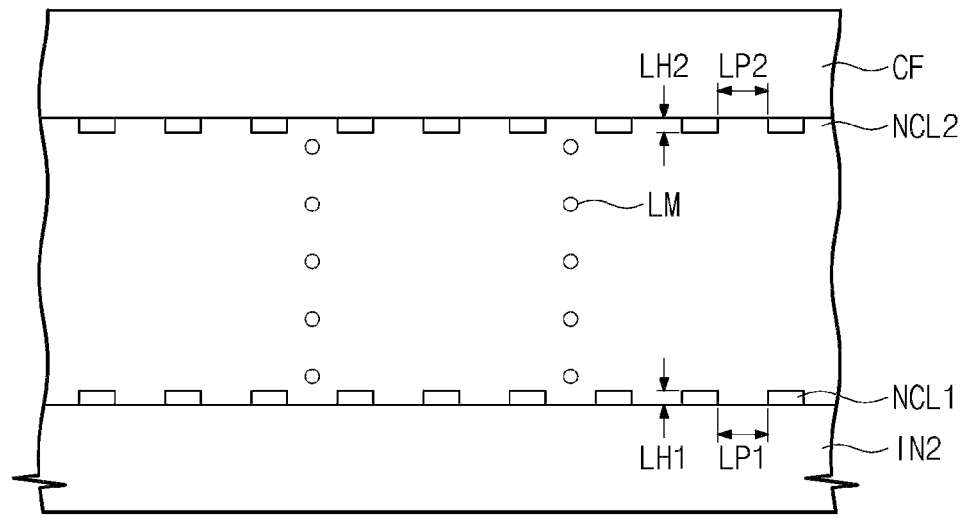
Figure 5C:
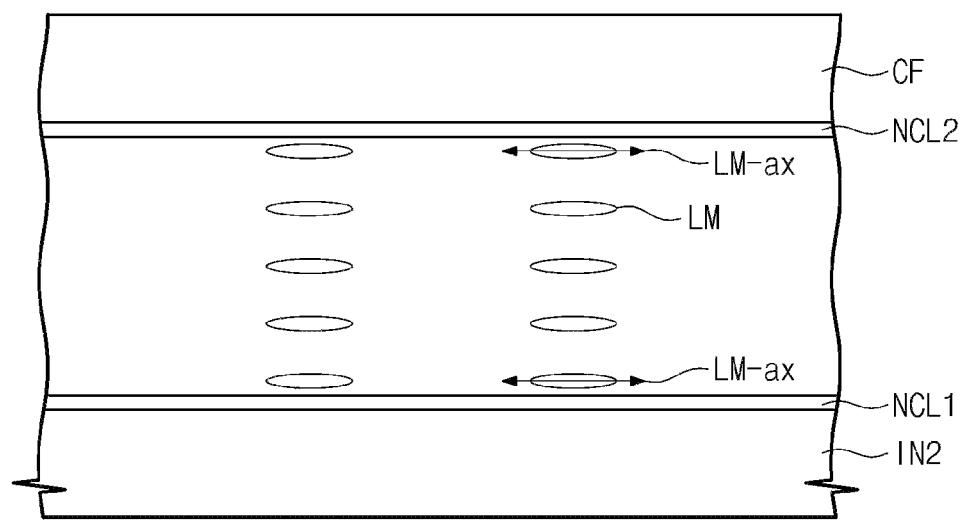

FIGS. 5A to 5C are partially enlarged views showing a portion of a display panel according to an exemplary embodiment of the present disclosure. In FIGS. 5A to 5C, the alignment of the liquid crystal molecules according to the arrangement of the pixel electrode and the common electrode will be described with reference to an area AA shown in FIG. 3B.

The display panel shown in FIGS. 5A to 5C has the same structure and function as that of the display panel shown in FIGS. 4A and 4B except for the extension directions of the first and second nano-conductive lines NCL1 and NCL2.

Referring to FIGS. 5A to 5C, the extension direction of the first nano-conductive lines NCL1 may be substantially parallel to the extension direction of the second nano-conductive lines NCL2. In detail, the first nano-conductive lines NCL1 extend in the second direction D2 and are arranged in the first direction D1.

The second nano-conductive lines NCL2 also extend in the second direction D2 and are also arranged in the first direction D1. That is, the direction in which the first nano-conductive lines NCL1 extend is substantially parallel to the direction in which the second nano-conductive lines NCL2 extend.

The liquid crystal molecules of the liquid crystal layer LCL are oriented by the first and second nano-conductive lines NCL1 and NCL2. The liquid crystal molecules disposed adjacent to the pixel electrode PE are aligned to allow the molecule axis LM-ax thereof to be substantially parallel to the extension direction of the first nano-conductive lines NCL1, as shown in FIG. 5C. In addition, the liquid crystal molecules disposed adjacent to the common electrode CE are aligned to allow the molecule axis LM-ax thereof to be substantially parallel to the extension direction of the second nano-conductive lines NCL2.

The alignment direction of the liquid crystal molecules disposed adjacent to the pixel electrode PE is substantially parallel to the alignment direction of the liquid crystal molecules disposed adjacent to the common electrode CE. Accordingly, the liquid crystal molecules are oriented to be substantially parallel to each other between the first substrate SUB1 and the second substrate SUB2.

In this case, the liquid crystal layer LCL has a horizontal liquid crystal alignment. In detail, the liquid crystal layer LCL has an electrically controlled birefringence (ECB) structure. The display apparatus according to the present exemplary embodiment is operated in the normally white mode or a normally black mode.

Figure 6:
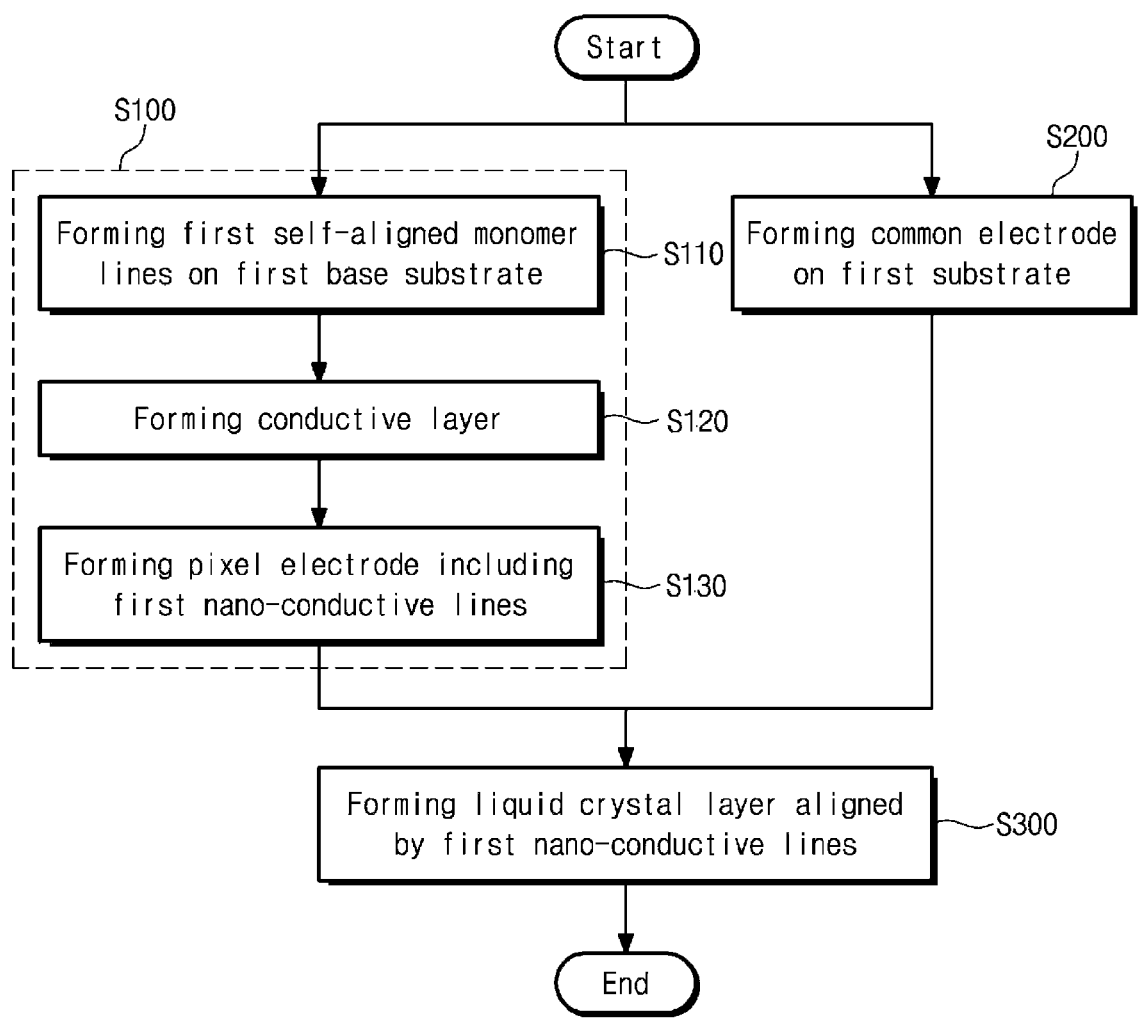
FIG. 6 is a flowchart showing a method of manufacturing a display panel according to an exemplary embodiment of the present disclosure.

FIG. 6 is a flowchart showing a method of manufacturing a display panel according to an exemplary embodiment of the present disclosure.

Referring to FIG. 6, the manufacturing method of the display panel includes forming the first substrate (S100), forming the second substrate (S200), and forming the liquid crystal layer (S300). The liquid crystal layer may be formed before or after the forming of the second substrate.

The first substrate includes the first base substrate BS1, the thin film transistor Tr disposed on the first base substrate BS1, and the pixel electrode PE disposed on the thin film transistor Tr. Accordingly, the forming of the first substrate (S100) includes forming the thin film transistor Tr on the first base substrate BS1 and forming the pixel electrode PE on the thin film transistor Tr.

As shown in FIG. 6, the first self-assembled monomer line is formed on the first base substrate BS1 (S110) in order to form the pixel electrode PE. Then, a conductive layer is formed on the first base substrate BS1 (S120). After that, the pixel electrode PE, including the first nano-conductive lines NCL1 (refer to FIG. 3B) is formed on the first base substrate BS1 (S130). The first nano-conductive lines NCL1 are formed by patterning the conductive layer.

The forming of the second substrate (S200) includes forming the common electrode CE on the second base substrate BS2.

Then, the liquid crystal layer LCL is formed on the first substrate (S300). In the present exemplary embodiment, the liquid crystal layer LCL is formed after the forming of the second substrate. The second substrate is disposed on the first substrate. The manufacturing method of the display panel further includes coupling the first substrate to the second substrate.

The liquid crystal layer LCL is formed by injecting liquid crystals between the first and second substrates. The liquid crystal molecules of the liquid crystal layer LCL are oriented by the first nano-conductive lines NCL1 when the liquid crystal layer LCL is formed (S300).

FIGS. 7A to 7G are cross-sectional views showing a method of manufacturing a display panel according to an exemplary embodiment of the present disclosure. In FIGS. 7A to 7G, the same reference numerals denote the same elements in FIGS. 1 to 6, and thus, detailed descriptions of the same elements will be omitted.

Figure 7A:
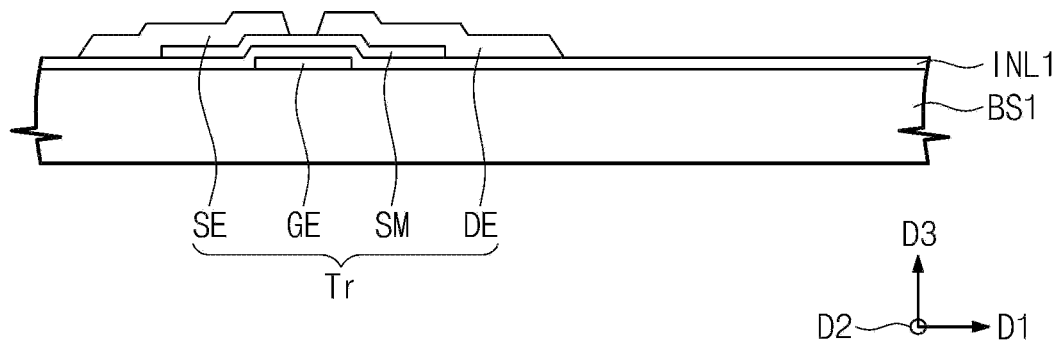
FIG. 7A, FIG. 7B, FIG. 7C, FIG. 7D, FIG. 7E, FIG. 7F, and FIG. 7G are cross-sectional views showing a method of manufacturing a display panel according to an exemplary embodiment of the present disclosure.

Referring to FIG. 7A, the thin film transistor Tr is formed on the first base substrate BS1. The gate electrode GE is formed on the first base substrate BS1. The gate electrode GE is protruded from a portion of the gate line GLi (refer to FIG. 3A). The gate electrode GE is formed by patterning a metal layer using a deposition, sputtering, or photo process.

The first insulating layer INL1 is formed on the first base substrate BS1 to cover the gate electrode GE. The first insulating layer INL1 includes silicon nitride or silicon oxide. The first insulating layer INL1 is formed by a deposition process. For instance, the first insulating layer INL1 is formed by a plasma-enhanced chemical vapor deposition.

The semiconductor pattern SM is formed on the first insulating layer INL1 and the source electrode SE and the drain electrode DE are formed on the semiconductor pattern SM. The semiconductor pattern SM may be formed by various ways. For instance, the semiconductor pattern SM is formed by forming a silicon layer using a plasma-enhanced chemical vapor deposition and patterning the silicon layer using a photolithography process.

The source electrode SE and the drain electrode DE are formed by patterning a conductive layer formed on the semiconductor pattern SM. For instance, a conductive material is deposited or sputtered on the semiconductor pattern SM to form the conductive layer, and then a photolithography process and an etching process are performed on the conductive material to form the source electrode SE and the drain electrode DE. Although not shown, the semiconductor pattern SM, the source electrode SE, and the drain electrode DE may be substantially and simultaneously formed by patterning a conductive layer.

Figure 7B:
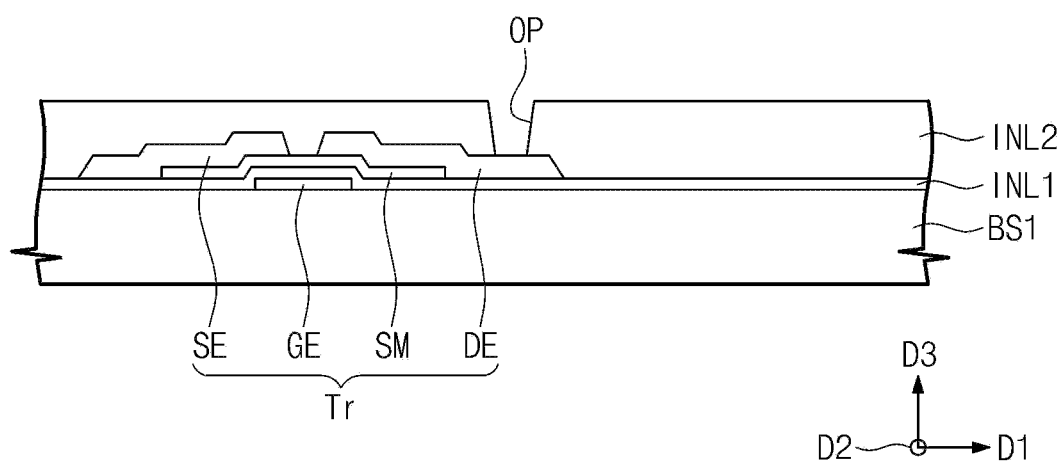

Referring to FIG. 7B, the second insulating layer INL2 is formed on the thin film transistor Tr. The second insulating layer INL2 is formed on the first insulating layer INL1 to cover the thin film transistor Tr.

The opening portion OP is formed through the second insulating layer INL2 to expose a portion of the drain electrode DE. An opening portion OP is formed by removing a portion of the second insulating layer INL2, which is overlapped with the drain electrode DE.

Figure 7C:
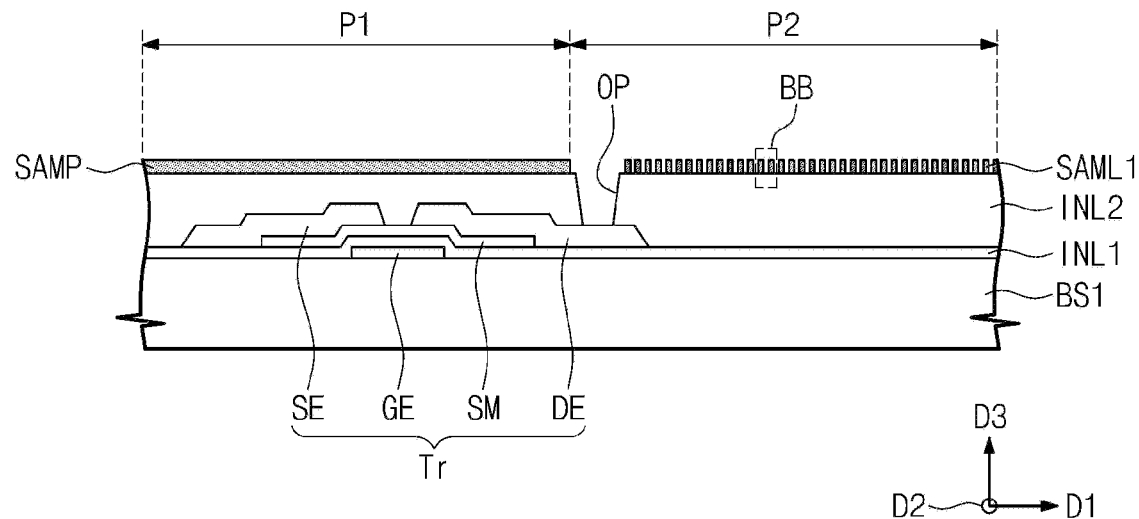
Figure 7D:
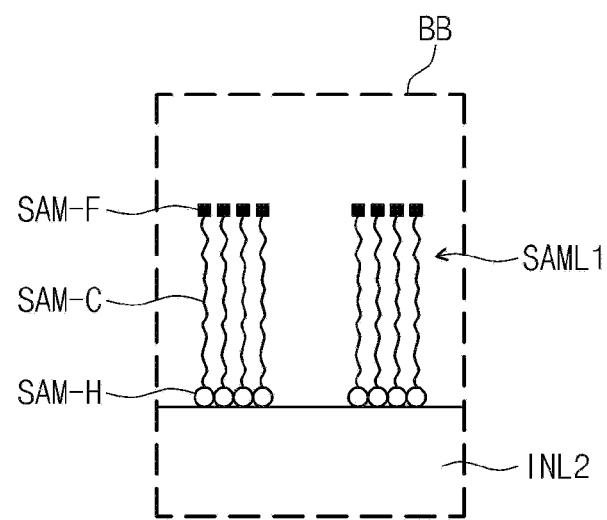

Referring to FIGS. 7C and 7D, a self-assembled monomer layer pattern SAMP is formed on the second insulating layer INL2. The self-assembled monomer layer pattern SAMP covers an upper surface of the second insulating layer INL2 except for the area in which the opening portion OP is formed.

As shown in FIG. 7C, the self-assembled monomer layer pattern SAMP includes a first part P1 and a second part P2. The first part P1 is overlapped with the thin film transistor Tr, and the second part P2 is overlapped with the area in which the pixel electrode is formed later.

The first part P1 covers the entire upper surface of the second insulating layer INL2 in the area corresponding to the thin film transistor Tr, and the second part P2 partially exposes the upper surface of the second insulating layer INL2 in the area in which the pixel electrode is later formed.

The second part P2 includes self-assembled monomer lines SAML1 extending in one direction and being spaced apart from each other. The second part P2 exposes portions of the upper surface of the second insulating layer INL2, which correspond to between the first self-assembled monomer lines SAML1. The first self-assembled monomer lines SAML1 will be described in later detail.

As shown in FIGS. 7C and 7D, the self-assembled monomer layer pattern SAMP includes a self-assembled monomer material. The self-assembled monomer material is an organic material, which is self-assembly coated on a surface of a base, e.g., the second insulating layer INL2, reacted with the self-assembled monomer material.

FIG. 7D is an enlarged view showing an area BB shown in FIG. 7C.

Referring to FIG. 7D, each of the first self-assembled monomer lines SAML1 includes a single layer defined by a plurality of self-assembled monomers, and is disposed on the second insulating layer INL2.

The self-assembled monomer includes a chain portion SAM-C, a head portion SAM-H, and an end portion SAM-F. The chain portion SAM-C may be an alkane chain. The chain portion SAM-C is connected between the head portion SAM-H and the end portion SMA-F.

The head portion SAM-H is connected to one end of the chain portion SAM-C and coupled to the surface of the base. In the head portion SAM-H reacts with the surface of the second insulating layer INL2. The head portion SAM-H is directly chemically coupled with a material used to form the second insulating layer INL2, and thus, the head portion SAM-H is coupled with the second insulating layer INL2.

The head portion SAM-H includes a reaction group that varies depending on a material used to form the base. For instance, when the second insulating layer INL2 includes the organic layer or silicon nitride, the head portion SAM-H includes thiol, silane, or phosphonate, but is not limited thereto. That is, the material of the head portion SAM-H is changed depending on the material used to form the layer on which the self-assembled monomer layer pattern SAMP is formed.

The end portion SAM-F is connected to the other end of the chain portion SAM-C. The end portion SAM-F exerts an influence on a planarization characteristic of the self-assembled monomer layer, a polarity of the surface of the self-assembled monomer layer, or a function of the self-assembled monomer layer. The end portion SAM-F includes a functional group, e.g., an alkyl group, an amino group, a hydrogenation group, a carboxyl group, etc.

The self-assembled monomer material may be strongly coupled with the second insulating layer INL2 as compared to an ionic-bonded material. In addition, because the self-assembled monomer material is not influenced by shape, curvature, or size of the surface of the base, the self-assembled monomer material may be formed on abase having a complex shape and a large size.

Figure 7E:
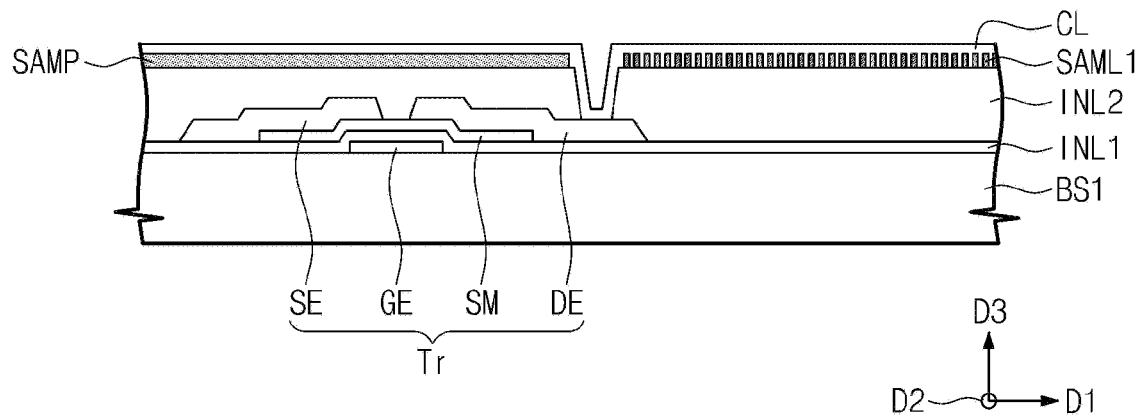

Referring to FIG. 7E, a conductive layer CL is formed on the self-assembled monomer layer pattern SAMP. In this case, the self-assembled monomer layer pattern SAMP is used as a mask to form the pixel electrode PE. The conductive layer CL covers the upper surface of the second insulating layer INL2 through the self-assembled monomer layer pattern SAMP.

The conductive layer CL covers the space between the self-assembled monomer layer pattern SAMP and the opening portion OP (referring to FIG. 7B) to form the contact hole CH. The conductive layer CL is electrically connected with the thin film transistor Tr through the contact hole CH.

Figure 7F:
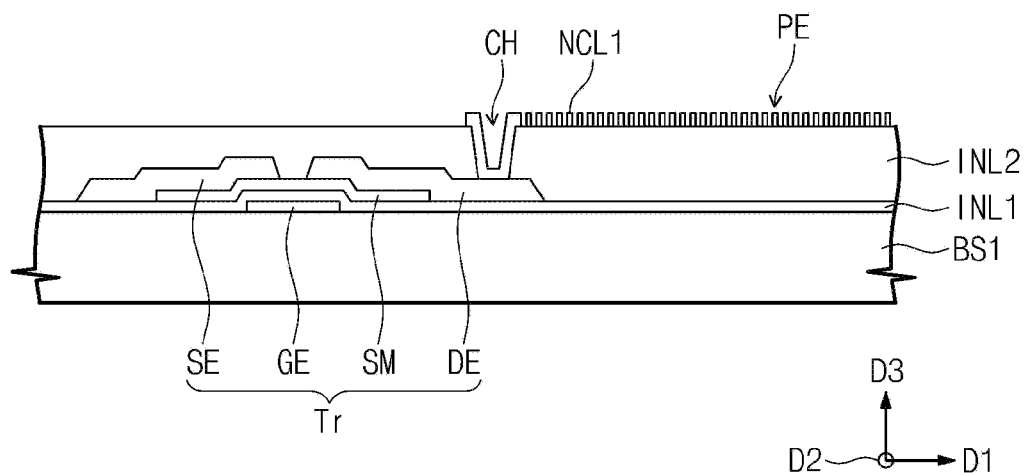

Referring to FIG. 7F, the self-assembled monomer layer pattern SAMP is removed. When the self-assembled monomer layer pattern SAMP is removed, the pixel electrode PE, including the first nano-conductive lines NCL1, is formed. The first nano-conductive lines NCL1 are formed by the conductive layer CL filled in the area exposed by the self-assembled monomer layer pattern SAMP.

Figure 7G:
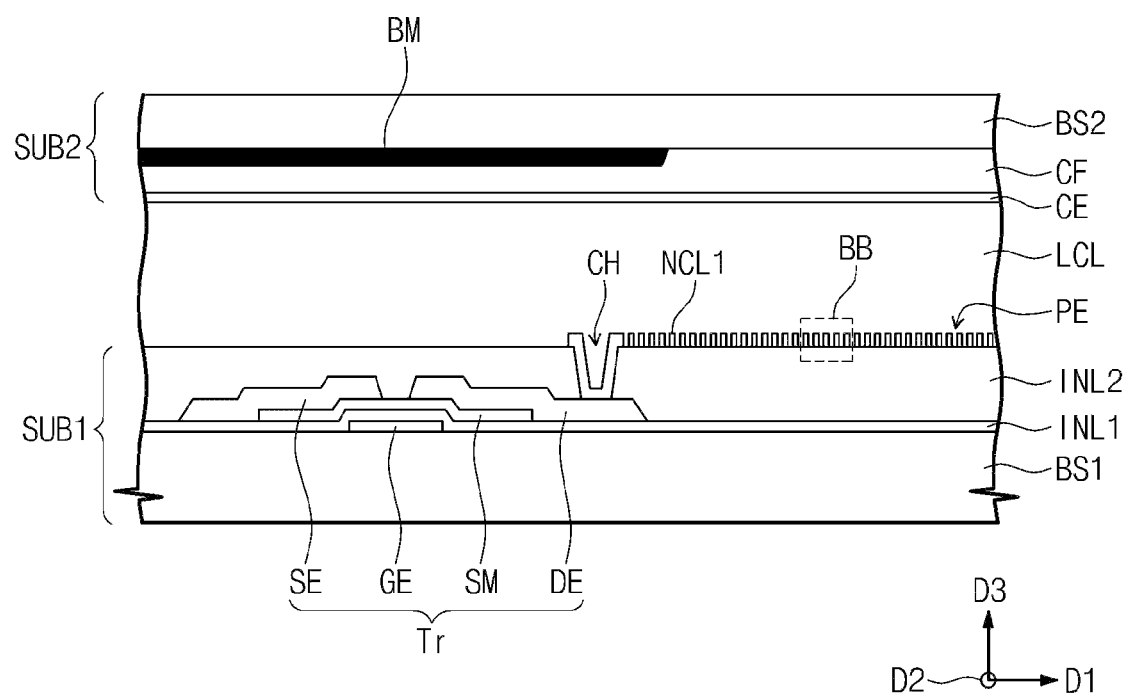

Referring to FIG. 7G, the second substrate SUB2 is formed. The second substrate SUB2 is formed by forming the black matrix BM and the color filter CF on the second base substrate BS, and forming the common electrode CE.

Although not shown in the FIGS., second self-assembled monomer lines (not shown) are formed on the second base substrate SUB2 and extend in one direction, and a conductive layer is formed on the second base substrate BS2 to cover the second self-assembled monomer lines. Then, when the second self-assembled monomer lines are removed, the second nano-conductive lines NCL2 are formed from the conductive layer, and the common electrode CE is formed. The process of forming the second nano-conductive lines NCL2 is substantially the same as that of the first nano-conductive lines NCL1.

The manufacturing order of the first and second substrates SUB1 and SUB2 may be changed. The first and second substrates SUB1 and SUB2 are coupled to each other. Then, the liquid crystal layer LCL is formed between the first and second substrates SUB1 and SUB2, and thus the display panel is completed.

The liquid crystal layer LCL may be formed by injecting the liquid crystals between the first and second substrates SUB1 and SUB2 after the first and second substrates SUB1 and SUB2 are coupled to each other, but is not limited thereto. That is, the liquid crystal layer LCL may be formed by dropping the liquid crystals on the first substrate SUB1 and then coupling the first substrate SUB1 to the second substrate SUB2.

The liquid crystal molecules of the liquid crystal layer LCL are oriented when the liquid crystal layer LCL is formed. In the present exemplary embodiment, the liquid crystal molecules of the liquid crystal layer LCL are oriented by the pixel electrode PE and the common electrode CE. In more detail, the liquid crystal molecules of the liquid crystal layer LCL are oriented by the extension direction of the first nano-conductive lines NCL1 and the extension direction of the second nano-conductive lines NCL2.

In the present exemplary embodiment, the second nano-conductive lines NLC2 extend in the direction substantially perpendicular to the direction in which the first nano-conductive lines NCL1 extend. Accordingly, the liquid crystal molecules of the liquid crystal layer LCL are oriented in the twisted nematic structure. However, according to another embodiment, the second nano-conductive lines NCL2 may extend in the direction substantially parallel to the direction in which the first nano-conductive lines NCL1 extend, and thus, the liquid crystal molecules of the liquid crystal layer LCL are oriented to be substantially parallel to each other.

FIGS. 8A to 8I are cross-sectional views showing a method of forming a self-assembled monomer line according to an exemplary embodiment of the present disclosure. FIGS. 8A to 8I show an area corresponding to the area BB shown in FIG. 7G.

Figure 8A:
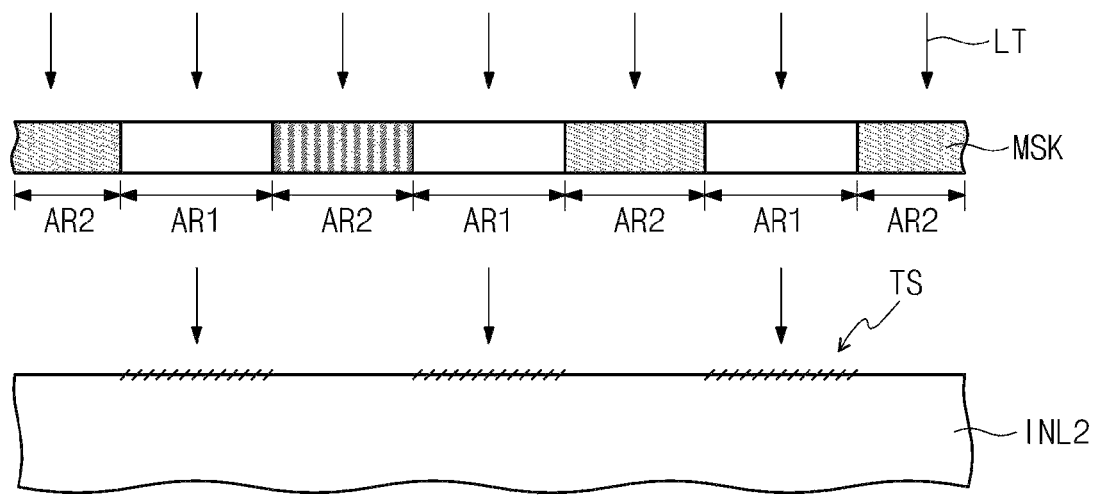
FIG. 8A, FIG. 8B, FIG. 8C, FIG. 8D, FIG. 8E, FIG. 8F, FIG. 8G, FIG. 8H, and FIG. 8I are cross-sectional views showing a method of forming a self-assembled monomer line according to an exemplary embodiment of the present disclosure.

Referring to FIG. 8A, a surface treatment is selectively performed on the upper surface of the second insulating layer INL2. The surface treatment is performed by disposing a mask MSK on the second insulating layer INL2 and radiating a light LT on the upper surface of the second insulating layer INL2 through the mask MSK.

The mask MSK includes light transmission areas AR1 and light blocking areas AR2, each disposed between the light transmission areas AR1. The light transmission areas AR1 are overlapped with the areas in which the first self-assembled monomer lines SAML1 are formed. The light LT may be a laser beam or an ultraviolet ray.

The morphology of the surface increases in the surface-treated portion TS of the second insulating layer INL2 or an activation material increases in the surface-treated portion TS. The activation material includes a functional group coupled to the head portion of the self-assembled monomer. When the morphology of the second insulating layer INL2 or the surface is activated, a coupling force between the second insulating layer INL2 and the self-assembled monomer is improved.

For instance, when the ultraviolet ray is radiated on the second insulating layer INL2, a hydroxyl group is formed in the second insulating layer INL2. A reactivity of the hydroxyl group against is high. Accordingly, among the self-assembled monomer material, the material coupled to the surface-treated portion TS may maintain the coupling force against the second insulating layer INL2 due to the high reactivity even though the following etching processes are performed.

Figure 8B:
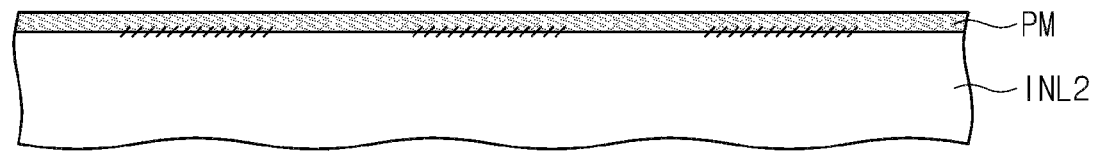

Referring to FIG. 8B, the material including the self-assembled monomers is coated on the second insulating layer INL2 to form a self-assembled monomer layer PM. The self-assembled monomer layer PM covers the second insulating layer INL2.

Figure 8C:
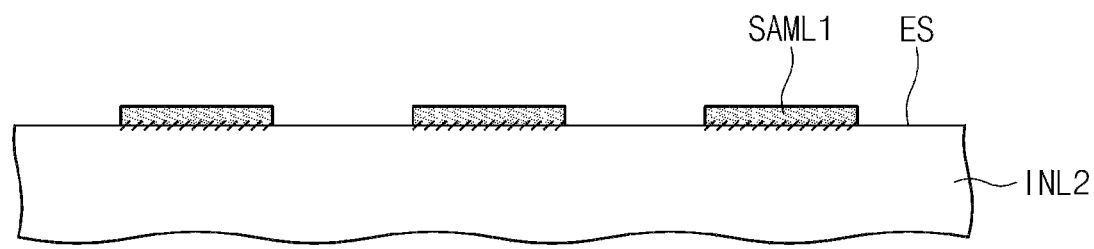

Referring to FIG. 8C, the self-assembled monomer layer PM is cleaned or selectively etched to be removed. In this case, the portion of the self-assembled monomer layer PM that is coupled to the surface-treated portion remains on the second insulating layer INL2 to form the first self-assembled monomer lines SAML1. The first self-assembled monomer lines SAML1 expose the portions ES of the second insulating layer INL2.

Figure 8D:
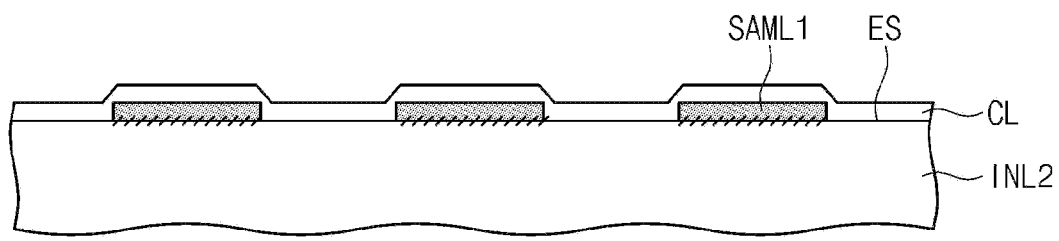

Referring to FIG. 8D, a conductive layer CL is formed on the second insulating layer INL2 after the first self-assembled monomer lines SAML1 are formed. The conductive layer CL covers the exposed portions ES of the second insulating layer INL2 through the first self-assembled monomer lines SAML1 and upper portions of the first self-assembled monomer lines SAML1.

Figure 8E:
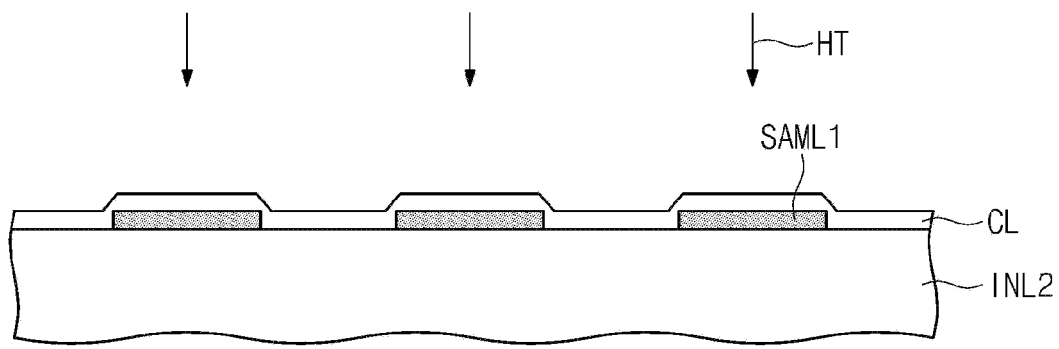
Figure 8F:
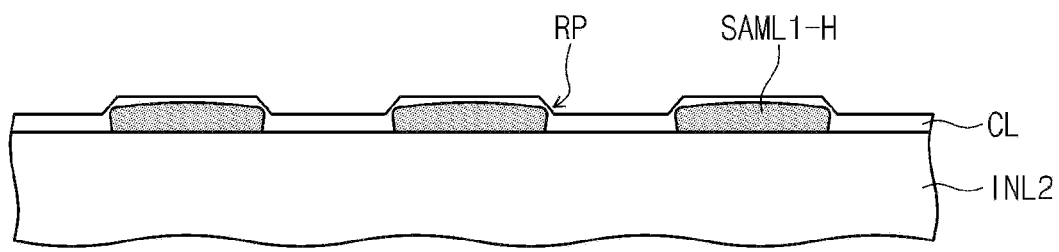

Referring to FIGS. 8E and 8F, the first self-assembled monomer lines AML1 are heat-treated. That is, a heat HT is applied to the first self-assembled monomer lines SAML1 to increase a temperature of the first self-assembled monomer lines SAML1.

Because the first self-assembled monomer lines SAML1 are composed of a polymer, the first self-assembled monomer lines SAML1 are not sensitive to the temperature compared to the conductive layer CL. The first self-assembled monomer lines SAML1-H, which are heat-treated, are deformed, and thus, a volume of the first self-assembled monomer lines SAML1-H is expanded or contracted.

As a result of the heat-treated first self-assembled monomer lines SAML1-H, a portion RP of the conductive layer CL becomes thin or is broken. Therefore, an etching material used to remove the heat-treated first self-assembled monomer lines SAML1-H may directly react with the heat-treated first self-assembled monomer lines SAML1-H disposed under the conductive layer CL.

In addition, the coupling force between the heat-treated first self-assembled monomer lines SAML1-H and the second insulating layer INL2 may be decreased. Thus, the first self-assembled monomer lines SAML1 may be easily removed from the second insulating layer INL2.

The manufacturing method of the display panel according to the present exemplary embodiment further includes the process of heat-treating the first self-assembled monomer lines SAML1, and thus, the first self-assembled monomer lines SAML1 may be easily removed. However, the heat-treating process on the first self-assembled monomer lines SAML1 may be omitted. In this case, the first self-assembled monomer lines SAML1 may be directly removed from the second insulating layer INL2 without performing the heat-treating process.

Figure 8G:
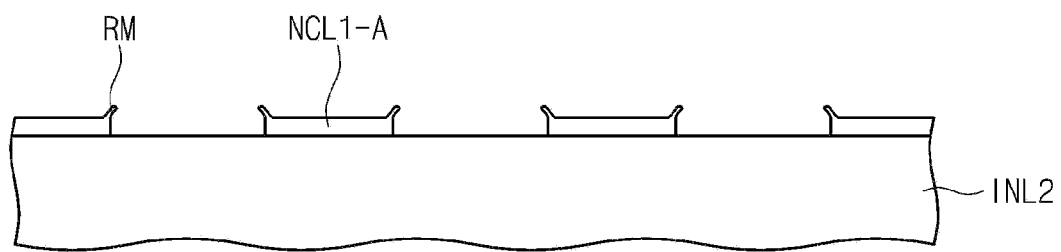

Referring to FIG. 8G, the heat-treated first self-assembled monomer lines SAML1_H or the first self-assembled monomer lines SAML1 are removed, and thus, conductive lines NCL1-A corresponding to the first nano-conductive lines NCL-1 are formed.

In this case, the heat-treated first self-assembled monomer lines SAML1_H or the first self-assembled monomer lines SAML1 may be physically removed. Accordingly, the conductive lines NCL1-A may have a shape in which residues RM remain at edges of the first nano-conductive lines NCL-1 that are formed later.

Figure 8H:
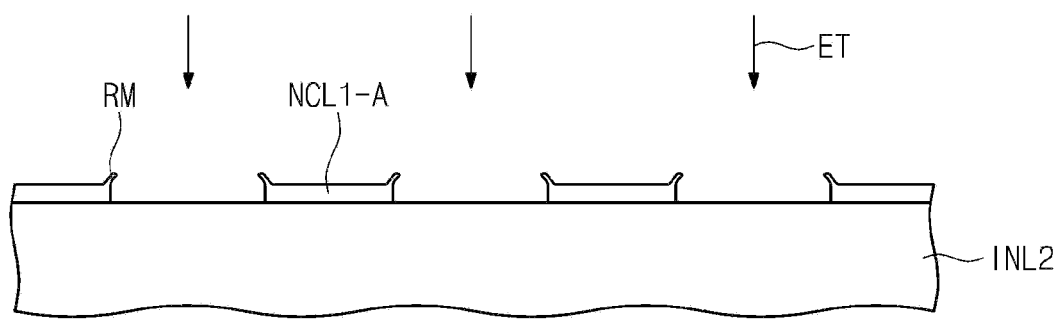
Figure 8I:
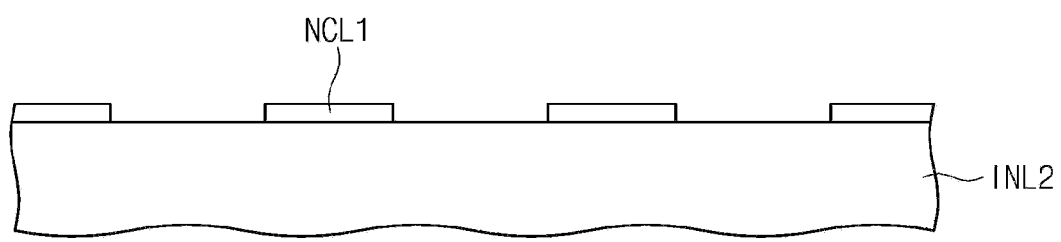

Referring to FIGS. 8H and 8I, the surface-treating process ET is performed on the conductive lines NCL1-A to remove the residues RM, and thus, the first nano-conductive lines NCL1 are formed, from which the residues RM are removed. The surface-treating process is performed using an etchant to remove the residues RM.

The manufacturing method of the display panel according to the present exemplary embodiment removes the residues RM through the surface-treating process using the etchant, and thus, the pixel electrode PE including uniformly-formed first nano-conductive lines NCL1 may be formed.

FIGS. 9A to 9D are cross-sectional views showing a method of forming a self-assembled monomer line according to an exemplary embodiment of the present disclosure. FIGS. 9A to 9D show an area corresponding to the area shown in FIGS. 8A to 8H.

Referring to FIGS. 9A to 9D, the first self-assembled monomer lines SAML1 may be formed by a nano-imprint method. To this end, an imprint mode IM on which nano-protruding lines PL are formed to be spaced apart from each other at regular intervals is prepared.

Then, the material layer including the self-assembled monomers is coated on the nano-protruding lines PL to form self-assembled monomer lines PM. The nano-protruding lines PL have the same pattern as that of the first self-assembled monomer lines SAML1 that are formed later.

Figure 9A:
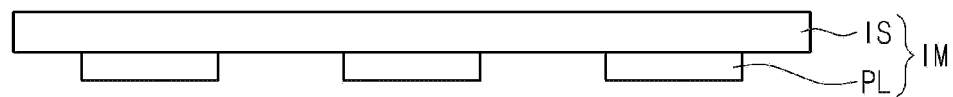
FIG. 9A, FIG. 9B, FIG. 9C, and FIG. 9D are cross-sectional views showing a method of forming a self-assembled monomer line according to an exemplary embodiment of the present disclosure.
Figure 9B:
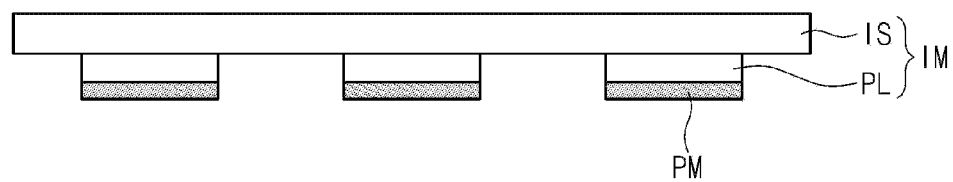
Figure 9C:
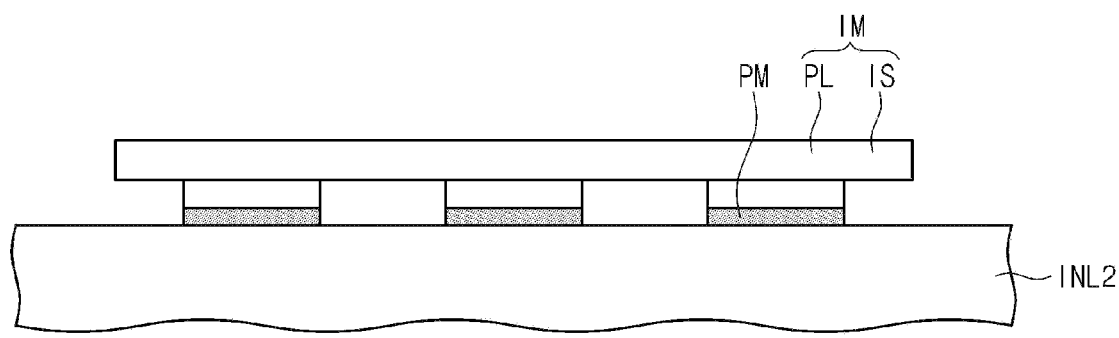
Figure 9D:
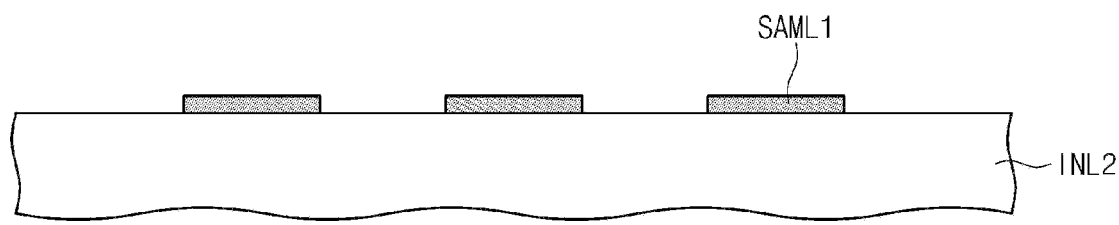

Referring to FIGS. 9C and 9D, the imprint mold IM is pressurized onto the second insulating layer INL2 to transfer the self-assembled monomer lines PM onto the second insulating layer INL2. Then, the imprint mold IM is removed to form the first self-assembled monomer lines SAML1.

The pixel electrode PE according to the present exemplary embodiment is formed using the first self-assembled monomer lines SAML1 as a mask. As described above, the first self-assembled monomer lines SAML1 may be formed through various methods. Therefore, the first nano-conductive lines included in the pixel electrode PE may be easily formed.

Although not shown in the FIGS., the first self-assembled monomer lines SAML1 may be formed by an injection molding method similar to the nano-imprint method.

According to the description provided above, the liquid crystal display panel, from which a polymer alignment layer is removed, is manufactured. In addition, the layer structure of the pixel area is simplified, and thus, the light transmittance of the pixel is improved. Further, since a process of rubbing an alignment layer is omitted, the foreign substance is prevented from entering the liquid crystal layer.

The liquid crystal display panel maintains transmittance and conductivity even though the alignment of the liquid crystal molecules of the liquid crystal layer is controlled by the nano-conductive lines. In addition, the liquid crystal display panel includes the nano-conductive lines finely arranged by using the self-assembled monomer material.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a liquid crystal display panel, comprising:
    forming a pixel electrode on a first base substrate, the pixel electrode comprising first nano-conductive lines extending in a first direction and arranged in a second direction substantially perpendicular to the first direction;
    disposing a second base substrate above the first base substrate;

forming a liquid crystal layer on the first nano-conductive lines, the first nano-conductive lines being configured to orient liquid crystal molecules of the liquid crystal layer; and forming an insulating layer on the first base substrate, wherein:

the forming of the pixel electrode comprises:
  forming first self-assembled monomer lines extending in the first direction on the first base substrate;
  covering the first self-assembled monomer lines with a conductive layer; and
  removing the first self-assembled monomer lines to form the first nano-conductive lines from the conductive layer;
the first nano-conductive lines are formed on the insulating layer; and
the forming of the first self-assembled monomer lines comprises:
  surface-treating areas of the insulating layer such that a coupling force between the insulating layer and the self-assembled monomers is increased;
  forming a self-assembled monomer layer on the insulating layer, the self-assembled monomer layer comprising the self-assembled monomers; and
  cleaning the self-assembled monomer layer such that the first self-assembled monomer lines are formed in the surface-treated areas.

2. The method of claim 1, wherein a distance in the second direction between the first nano-conductive lines is equal to or less than about 1000 nm, and each of the first nano-conductive lines has a height equal to or less than about 20 nm.

3. The method of claim 1, wherein each of the self-assembled monomers comprises:
  a chain portion;
  a head portion connected to a first end of the chain portion configured to react with the insulating layer; and
  an end portion connected to a second end of the chain portion, and
  wherein the head portion comprises at least one of thiol, silane, and phosphonate.

4. The method of claim 3, wherein the surface-treating is performed by radiating light onto the surface-treated areas,
  wherein the light forms a functional group on the insulating layer in the surface-treated areas, and
  wherein the functional group is bonded to the head portion and is configured to form the first self-assembled monomer lines on the surface of the insulating layer in the surface-treated areas.

5. The method of claim 4, wherein the light comprises a laser beam or ultraviolet light.

6. The method of claim 4, wherein the insulating layer comprises an organic material, silicon oxide, or silicon nitride.

7. The method of claim 1, wherein the forming of the first self-assembled monomer lines comprises:
  pressurizing self-assembled monomer lines formed on an imprint mold comprising nano-protruding lines extending in one direction onto the first base substrate and configured to transfer the self-assembled monomer lines on the first base substrate.

8. A method of manufacturing a liquid crystal display panel, comprising:
  forming a pixel electrode on a first base substrate, the pixel electrode comprising first nano-conductive lines extending in a first direction and arranged in a second direction substantially perpendicular to the first direction;
  disposing a second base substrate above the first base substrate; and
  forming a liquid crystal layer on the first nano-conductive lines, the first nano-conductive lines being configured to orient liquid crystal molecules of the liquid crystal layer,
  wherein:
  the forming of the pixel electrode comprises:
    forming first self-assembled monomer lines extending in the first direction on the first base substrate;
    covering the first self-assembled monomer lines with a conductive layer;
    heat-treating the first self-assembled monomer lines;
    removing the first self-assembled monomer lines to form the first nano-conductive lines from the conductive layer; and
    surface-treating the first nano-conductive lines using an etchant to remove residues coupled to edges of the first nano-conductive lines.

9. The method of claim 1, further comprising a common electrode comprising second nano-conductive lines extending in one direction on the second base substrate, wherein the liquid crystal layer is oriented by the first and second nano-conductive lines.

10. The method of claim 9, wherein the forming of the common electrode comprises:
  forming second self-assembled monomer lines extending in the one direction on the second base substrate;
  forming a conductive layer on the second base substrate to cover the second self-assembled monomer lines; and
  removing the second self-assembled monomer lines to form the second nano-conductive lines from the conductive layer.

11. The method of claim 10, wherein the one direction in which the second nano-conductive lines extend is substantially parallel to the first direction.

12. The method of claim 11, wherein the one direction in which the second nano-conductive lines extend is substantially parallel to the second direction.

* * * * *